(12) United States Patent
Baer et al.

(10) Patent No.: US 10,519,579 B2
(45) Date of Patent: *Dec. 31, 2019

(54) NONWOVEN FABRICS OF SHORT INDIVIDUALIZED BAST FIBERS AND PRODUCTS MADE THEREFROM

(71) Applicant: GPCP IP Holdings LLC, Atlanta, GA (US)

(72) Inventors: Samuel Charles Baer, Atlanta, GA (US); Alan Edward Wright, Roswell, GA (US); Joseph H. Miller, Neenah, WI (US); Micheal Shea Lerch, Roswell, GA (US)

(73) Assignee: GPCP IP Holdings LLC, Atlanta, GA (US)

( * ) Notice: Subject to any disclaimer, the term of this patent is extended or adjusted under 35 U.S.C. 154(b) by 347 days.

This patent is subject to a terminal disclaimer.

(21) Appl. No.: 14/200,338

(22) Filed: Mar. 7, 2014

(65) Prior Publication Data

US 2014/0273704 A1  Sep. 18, 2014

Related U.S. Application Data

(60) Provisional application No. 61/793,448, filed on Mar. 15, 2013.

(51) Int. Cl.
| | | |
|---|---|---|
| *D04H 1/4266* | (2012.01) | |
| *B32B 5/26* | (2006.01) | |
| *B32B 7/12* | (2006.01) | |
| *D04H 13/00* | (2006.01) | |
| *B32B 5/02* | (2006.01) | |
| *B32B 27/12* | (2006.01) | |
| *B32B 27/32* | (2006.01) | |
| *B32B 27/40* | (2006.01) | |
| *B29C 59/04* | (2006.01) | |

(52) U.S. Cl.
CPC .......... *D04H 1/4266* (2013.01); *B32B 5/022* (2013.01); *B32B 5/024* (2013.01); *B32B 5/26* (2013.01); *B32B 7/12* (2013.01); *B32B 27/12* (2013.01); *B32B 27/32* (2013.01); *B32B 27/40* (2013.01); *D04H 13/00* (2013.01); *B29C 59/04* (2013.01); *B32B 2260/021* (2013.01); *B32B 2260/046* (2013.01); *B32B 2262/062* (2013.01); *B32B 2262/065* (2013.01); *B32B 2307/304* (2013.01); *B32B 2307/54* (2013.01); *B32B 2307/724* (2013.01); *B32B 2307/7248* (2013.01); *B32B 2432/00* (2013.01); *B32B 2555/00* (2013.01); *B32B 2555/02* (2013.01); *Y10T 442/608* (2015.04); *Y10T 442/627* (2015.04)

(58) Field of Classification Search
CPC .......... G02B 6/4215; H01L 31/022408; H01L 31/02327; H01L 31/028; H01L 31/035281; H01L 31/105; Y02E 10/547; B29C 59/04; B32B 2260/021; B32B 2260/046; B32B 2262/062; B32B 2262/065; B32B 2307/304; B32B 2307/54; B32B 2307/724; B32B 2307/7248; B32B 2432/00; B32B 2555/00; B32B 2555/02; B32B 27/12; B32B 27/32; D04H 13/00; D04H 1/4266; Y10T 442/608; Y10T 442/627

See application file for complete search history.

(56) References Cited

U.S. PATENT DOCUMENTS

| | | |
|---|---|---|
| 797,749 A | 8/1905 | Robinson et al. |
| 2,045,095 A | 7/1934 | Osborne |
| 2,407,227 A | 11/1943 | Earle |
| 2,689,199 A | 9/1954 | Pesce |
| 3,301,746 A | 1/1967 | Sanford et al. |
| 3,485,706 A | 12/1969 | Evans |
| 3,554,862 A | 1/1971 | Hervey et al. |
| 3,563,241 A | 2/1971 | Evans |
| 3,785,922 A | 1/1974 | Keller |
| 3,849,241 A | 11/1974 | Butin et al. |
| 3,917,785 A | 11/1975 | Kalwaites |
| 4,014,635 A | 3/1977 | Kroyer |
| 4,081,319 A | 3/1978 | Conway |
| 4,100,324 A | 7/1978 | Anderson et al. |
| 4,144,122 A | 3/1979 | Emanuelsson et al. |
| 4,200,488 A | 4/1980 | Brandon et al. |
| 4,442,161 A | 4/1984 | Kirayoglu et al. |
| 4,469,734 A | 9/1984 | Minto et al. |
| 4,476,323 A | 10/1984 | Hellsten et al. |
| 4,559,157 A | 12/1985 | Smith et al. |

(Continued)

FOREIGN PATENT DOCUMENTS

| | | |
|---|---|---|
| CA | 841938 A | 5/1970 |
| CA | 2751162 A1 | 8/2010 |

(Continued)

OTHER PUBLICATIONS

International Search Report and Written Opinion dated Jul. 28, 2014 for Application No. PCT/US2014/021771.

(Continued)

*Primary Examiner* — Arti Singh-Pandey

(57) ABSTRACT

Nonwoven textile fabrics in accordance with the present invention are formed primarily of individualized bast fibers substantially free of pectin having a mean length less than 6 millimeters. The nonwoven fabric can include staple fibers and/or pulp fibers. Individualized bast fibers include fibers derived from the flax and hemp plants. The nonwoven textile fabric is formed into a web while in a dry state and subsequently bonded to produce a nonwoven fabric.

32 Claims, No Drawings

(56) References Cited

U.S. PATENT DOCUMENTS

| | | | |
|---|---|---|---|
| 4,617,383 A | 10/1986 | Jaskowski | |
| 4,640,810 A | 2/1987 | Laursen et al. | |
| 4,667,890 A | 5/1987 | Gietman, Jr. | |
| 4,690,821 A | 9/1987 | Smith et al. | |
| 4,755,421 A | 7/1988 | Manning et al. | |
| 4,787,699 A | 11/1988 | Moulin | |
| 4,795,476 A | 1/1989 | Bean et al. | |
| 4,808,467 A | 2/1989 | Suskind et al. | |
| 4,818,464 A | 4/1989 | Lau | |
| 5,205,835 A | 4/1993 | Tieckelmann et al. | |
| 5,284,703 A | 2/1994 | Everhart et al. | |
| 5,292,581 A | 3/1994 | Viazmensky et al. | |
| 5,350,624 A | 9/1994 | Georger et al. | |
| 5,389,202 A | 2/1995 | Everhart et al. | |
| 5,573,637 A | 11/1996 | Ampulski et al. | |
| 5,674,591 A | 10/1997 | James et al. | |
| 5,683,794 A | 11/1997 | Wadsworth et al. | |
| 5,695,868 A | 12/1997 | McCormack | |
| 5,843,057 A | 12/1998 | McCormack | |
| 5,853,538 A | 12/1998 | Reiner | |
| 5,891,126 A | 4/1999 | Osborn, III et al. | |
| 5,948,710 A | 9/1999 | Pomplun et al. | |
| 5,958,186 A | 9/1999 | Holm et al. | |
| 5,985,186 A | 11/1999 | Kasprzyk et al. | |
| 6,037,407 A | 3/2000 | Derian et al. | |
| 6,051,749 A | 4/2000 | Schulz | |
| 6,163,943 A | 12/2000 | Johansson et al. | |
| 6,423,397 B1 | 7/2002 | Roussel | |
| 6,713,413 B2 | 3/2004 | Kruegler | |
| 6,762,138 B2 | 7/2004 | Ferreira et al. | |
| 6,884,837 B2 | 4/2005 | Kohlhammer et al. | |
| 6,994,865 B2 | 2/2006 | Branham et al. | |
| 7,432,219 B2 | 10/2008 | Strandqvist et al. | |
| 7,481,843 B2 | 1/2009 | Xu | |
| 7,546,698 B2 | 6/2009 | Meschter | |
| 7,566,015 B2 | 7/2009 | Schoppel et al. | |
| 7,732,357 B2 | 6/2010 | Annis et al. | |
| 7,772,138 B2 | 8/2010 | Lostocco et al. | |
| 7,892,397 B2 | 2/2011 | Luo et al. | |
| 7,932,196 B2 | 4/2011 | McCormack et al. | |
| 8,133,825 B2 | 3/2012 | Bunyard et al. | |
| 8,287,986 B2 | 10/2012 | Huss et al. | |
| 8,293,072 B2 | 10/2012 | Super et al. | |
| 8,591,701 B2 | 11/2013 | Sung et al. | |
| 8,603,802 B2 | 12/2013 | Sung et al. | |
| 9,926,654 B2 * | 3/2018 | Baer | D04H 1/64 |
| 9,926,655 B2 * | 3/2018 | Baer | D04H 1/425 |
| 9,949,609 B2 * | 4/2018 | Baer | A47L 13/16 |
| 2001/0027545 A1 | 10/2001 | Fujiwara | |
| 2003/0065059 A1 | 4/2003 | Krishnaswamy | |
| 2003/0211802 A1 | 11/2003 | Keck et al. | |
| 2003/0215602 A1 | 11/2003 | Andersson et al. | |
| 2004/0048032 A1 | 3/2004 | Ankele | |
| 2005/0092417 A1 | 5/2005 | Billgren et al. | |
| 2005/0136773 A1 | 6/2005 | Yahiaoui et al. | |
| 2005/0136779 A1 | 6/2005 | Stralin et al. | |
| 2005/0245151 A1 | 11/2005 | Annis et al. | |
| 2005/0245161 A1 | 11/2005 | Sain et al. | |
| 2008/0020449 A1 | 1/2008 | Matsubara | |
| 2008/0153375 A1 | 6/2008 | Wilfong et al. | |
| 2008/0261476 A1 | 10/2008 | Strandqvist et al. | |
| 2009/0092835 A1 | 4/2009 | Xu | |
| 2009/0104430 A1 | 4/2009 | Cordial et al. | |
| 2009/0286059 A1 | 11/2009 | Ogawa et al. | |
| 2010/0093245 A1 | 4/2010 | Bradley et al. | |
| 2010/0130086 A1 | 5/2010 | Dorsey et al. | |
| 2010/0147472 A1 | 6/2010 | Sung et al. | |
| 2010/0203291 A1 | 8/2010 | Dyer et al. | |
| 2010/0203306 A1 | 8/2010 | Fingal et al. | |
| 2010/0240113 A1 | 9/2010 | Liu et al. | |
| 2011/0057346 A1 | 3/2011 | Nunn | |
| 2011/0236665 A1 | 9/2011 | Roque et al. | |
| 2011/0250813 A1 | 10/2011 | Bradley et al. | |
| 2011/0312066 A1 | 12/2011 | Sung et al. | |
| 2012/0021171 A1 | 1/2012 | Riviere et al. | |
| 2012/0046394 A1 | 2/2012 | Lu et al. | |
| 2012/0144611 A1 | 6/2012 | Baker et al. | |
| 2012/0199301 A1 | 8/2012 | Strandqvist | |
| 2013/0149512 A1 | 6/2013 | Hijosa et al. | |
| 2013/0198984 A1 | 8/2013 | Strandqvist | |
| 2013/0220151 A1 | 8/2013 | Sauter et al. | |
| 2014/0066872 A1 * | 3/2014 | Baer | D04H 1/46 604/367 |
| 2014/0259484 A1 * | 9/2014 | Baer | A47L 13/16 15/104.93 |
| 2016/0201239 A1 * | 7/2016 | Baer | D04H 1/425 442/334 |

FOREIGN PATENT DOCUMENTS

| | | |
|---|---|---|
| CA | 2882586 A1 | 3/2014 |
| CA | 2905734 A1 | 9/2014 |
| CN | 1142798 A | 2/1997 |
| CN | 1743527 A | 2/1997 |
| CN | 1743527 A | 3/2006 |
| CN | 1907185 A | 2/2007 |
| CN | 1907185 A | 7/2007 |
| CN | 102239284 A | 11/2011 |
| EP | 0408199 A1 | 1/1991 |
| EP | 0931862 A1 | 7/1999 |
| EP | 1046747 A1 | 10/2000 |
| EP | 1090176 A1 | 4/2001 |
| EP | 1350456 A1 | 10/2003 |
| EP | 1046747 B1 | 11/2010 |
| EP | 2540892 B1 | 7/2011 |
| EP | 2540892 B1 | 4/2014 |
| JP | 52132122 A | 4/1976 |
| JP | S61160407 A1 | 7/1986 |
| JP | 11099636 A | 4/1999 |
| JP | 2001322196 A | 11/2001 |
| JP | 2005220505 A | 8/2005 |
| JP | 2008106383 | 5/2008 |
| JP | 2008137241 A | 6/2008 |
| JP | 2008231596 A | 10/2008 |
| JP | 2012516398 A1 | 7/2012 |
| JP | 2008240177 A | 10/2018 |
| WO | 9710100 A1 | 3/1997 |
| WO | 9826808 A2 | 6/1998 |
| WO | 9937834 A1 | 7/1999 |
| WO | 03099886 A1 | 12/2003 |
| WO | 2005025865 A1 | 3/2005 |
| WO | 2005012616 A1 | 10/2005 |
| WO | 2007140054 A1 | 12/2007 |
| WO | 2007140578 A1 | 12/2007 |
| WO | 2009139508 A1 | 11/2009 |
| WO | 2010088359 A | 8/2010 |
| WO | 2010088359 A1 | 8/2010 |
| WO | 2012050494 A1 | 4/2012 |
| WO | 2014039361 A1 | 3/2014 |
| WO | 2015023558 A1 | 2/2015 |

OTHER PUBLICATIONS

International Search Report and Written Opinion dated Nov. 27, 2014 for Application No. PCT/US2014/050478.

Batra, Subhash Kumar, et al.; "Introduction to Nonwovens Technology"; DEStech Publications, Inc.; p. 131-160; 2012.

Chemical Week Publication; "New Chemical Perspectives"; Soap and Cosmetics; p. 4, p. 12-13; Mar. 2000.

Floyd, Don E.; "Polyamide Resins"; Reinhold Publishing Corporation; p. 1-227; 1996.

International Search Report and Written Opinion dated Dec. 3, 2013 for Application No. PCT/US2013/057228.

Lee et al., "Antimicrobial and Blood Repellent Finishes for Cotton and Nonwoven Fabrics Based on Chitosan and Fluropolymers", Textile Research Journal, 69 (2), Feb. 1999; pp. 104-112.

Chinese Search Report dated Mar. 3, 2016 for Application No. 201380046325.7.

European Search Report dated Mar. 22, 2016 for Application No. 13835305.7-1308 / 2893068.

International Search Report and Written Opinion dated Jun. 30, 2014 for Application No. PCT/US2014/021760.

(56) References Cited

OTHER PUBLICATIONS

International Search Report and Written Opinion dated Oct. 23, 2015 for Application No. PCT/US2015/044138.
Chinese Office Action dated Mar. 5, 2017.
Taiwanese Office Action dated Jul. 7, 2017.
English Abstract as published in WO 1995016562 A1 of Chinese Patent No. CN1142798A.
English Abstract as published in WO 2010042536 A1 of Chinese Patent No. CN102239284A.
European Extended Search Report dated Aug. 16, 2016.
A Study on the Degumming and Modification of Kenaf Bast Fiber by Bio-enzyme Degradation (Doctoral Dissertation). Jul. 15, 2008.
Chinese Doctoral Dissertations Full-Text Database, Jul. 2008, Engineering Science and Technology; ISSN 1674-022X.
Chinese Office Action dated Oct. 21, 2016.
Extended European Search Report & Written Opinion dated Aug. 16, 2016.
Chinese Doctoral Disseratations Full-text Database; Engineering Science and Technology, ISSN 1674-022X-CN 11-9133/G, Jul. 2008.

* cited by examiner

NONWOVEN FABRICS OF SHORT INDIVIDUALIZED BAST FIBERS AND PRODUCTS MADE THEREFROM

CROSS-REFERENCE TO RELATED APPLICATIONS

This application claims benefit of U.S. Provisional Patent Application Ser. No. 61/793,448, filed Mar. 15, 2013, which is incorporated herein in its entirety by reference.

TECHNICAL FIELD OF THE INVENTION

The present invention relates generally to nonwoven textile fabrics. More specifically, the present invention relates to a nonwoven textile fabric comprised primarily of individualized bast fibers.

BACKGROUND OF THE INVENTION

Fibers utilized to produce woven and nonwoven textiles fall into the two broad categories: man-made and natural. Common man-made fibers include, for example, polyester, nylon, and polypropylene. Such thermoplastic polymers are melt spun into filaments which can be either air formed into nonwoven textiles directly as described in U.S. Pat. No. 2,689,199, which is incorporated herein in its entirety by reference, or cut into finite length fibers (known commonly as "staple fibers") which can be formed into threads and yarn for woven or knit textiles. In addition, staple fibers can be formed directly into randomly oriented fiber webs and subsequently bonded together by a variety of means to form a nonwoven textile fabric. Such staple fibers generally are kinked when employed in nonwoven webs.

The most widely known natural fibers are cotton, wool, and silk. Wool and silk are exclusively used for woven textiles. Cotton is the dominant fiber for woven textiles, although it also has minor utilization in nonwoven textiles. Cotton has limited use for modern nonwoven textile production due to its tendency to form fiber bundles when processed with the high speed carding typical of nonwoven production lines.

Wood pulp is one of the most common natural fibers and primarily is used for papermaking. Yet, wood pulp has a significant presence in the nonwoven textile industry when combined with man-made filament or staple fiber and the hydroentangling web bonding process. See, for example, U.S. Pat. Nos. 4,442,161 and 5,284,703, both of which are incorporated herein in their entirety by reference. Wood pulp has no direct presence in the woven textile industry. Rather, cellulose, the natural polymer that constitutes wood pulp fibers and other vegetative matter, is formed into a manmade class of filaments known as, for example, rayon (sometimes referred to as viscose), TENCEL®, Lyocell®, and derivatives thereof. Such man-made cellulosic fibers are used in both woven and nonwoven textiles. Such polymeric fibers are formed by chemically dissolving cellulosic matter, and spinning filaments from the cellulosic solution. For use in dry formed webs, man-made cellulosic fibers are typically crimped and cut into staple fibers. Fiber crimping is not required for wet formed webs.

Another major category of natural fibers is bast fibers. Bast fibers are found in the stalks of the flax, hemp, jute, ramie, nettle, Spanish broom, and kenaf plants, to name only a few. Typically, native state bast fibers are 1 to 4 meters in length. These long native state fibers are comprised of bundles of individual fibers which are straight and have a length between 20-100 millimeters (mm). The bundled individual fibers are glued together by a class of plant resins called pectins.

Bast fibers have been used for at least 8,000 years for both woven textiles and cordage. However, such textiles and cordage were formed only with the native state bast fiber bundles. An example of a woven textile produced with flax bast fiber bundles is linen. More recently, as provided in U.S. Pat. No. 7,481,843, partially separated bast fiber is produced to form yarns and threads for woven textiles. However, yarns and threads are not suited for nonwoven fabrics.

Nonwoven web forming methods for natural and manmade staple fibers include wet forming. Wet forming is similar to the papermaking process, except that the ratio of forming water weight to fiber weight is much higher than that of conventional papermaking with wood pulp. The wet forming process accommodates staple fibers which are typically 6 mm-10 mm long and wood pulp fibers which are typically 2-4 mm long. However, a nonwoven web comprising substantially pectin-free, individualized bast fibers having a mean length of less than 6 mm is not presently available in the market.

Accordingly, there is a need for a nonwoven fabric which employs natural fibers having a length less than 6 mm. It is to solving this problem the present invention is directed.

SUMMARY OF THE INVENTION

In accordance with the present invention, a nonwoven fabric comprising substantially pectin-free, individualized bast fibers having a mean length less than 6 (mm) is described herein. In another aspect, the nonwoven fabric comprises substantially pectin-free, individualized bast fibers having a mean length of about 4 mm. Yet, in another aspect, the nonwoven fabric comprises substantially pectin-free, individualized bast fibers having a mean length of less than 3 mm. Typically, the nonwoven fabric comprises a majority the individualized bast fibers. The nonwoven fabric can include man-made fibers, such as petroleum based and reconstituted cellulosic fibers, and/or plant-based pulp fibers, such as wood pulp fibers. Bast fibers are extracted from, but not limited to, flax, hemp, jute, ramie, nettle, Spanish broom, kenaf plants. The nonwoven fabric of the present invention can employ bast fibers derived from one or any combination of the aforementioned plants.

Individualized bast fibers utilized in this invention are typically straight and are substantially pectin free. Conventional "individualized" bast fibers, however, may be only subjected to mechanical individualization, not chemical individualization required to substantially remove pectin content. Enzymatic individualization is a non-limiting example of chemical individualization. For example, individualized bast fibers have less than 10% by weight of the pectin content of the naturally occurring fibers from which the substantially pectin-free fibers are derived. In another aspect, individualized bast fibers have less than 15% by weight of the pectin content of the naturally occurring fibers from which the substantially pectin-free fibers are derived. Still, in another aspect, individualized bast fibers have less than 20% by weight of the pectin content of the naturally occurring fibers from which the substantially pectin-free fibers are derived. Still, in another aspect, individualized bast fibers have less than 0.1% by weight, less than 0.15% by weight, or less than 0.20% by weight, of the pectin content of the naturally occurring fibers from which the substantially pectin-free fibers are derived.

Typically, individualized bast fibers of the present invention have a mean length in a range between about 4 and less than 6 mm depending on the characteristics of the particular bast fibers and the cut length of the plant stalks prior to chemical processing, or mechanical cutting or chopping of bast fibers after chemical processing. In addition, bast fibers may be cut to length less than 6 mm after chemical processing.

In one aspect, the individualized bast fibers have a mean length of at less than 6 mm. In another aspect, the individualized bast fibers have a mean length of about 4 mm. Yet, in another aspect, the nonwoven fabric comprises substantially pectin-free, individualized bast fibers having a mean length of less than 3 mm.

The nonwoven fabric can also comprise staple fibers derived from one or more source. Staple fibers include, but are not limited to, cellulosic fibers and thermoplastic fibers. An example of a cellulosic staple fiber comprises rayon. Thermoplastic fibers include the conventional polymeric fibers utilized in the nonwoven industry. Such fibers are formed from polymers which include, but are not limited to, a polyester such as polyethylene terephthalate; a nylon; a polyamide; a polyolefin such as polypropylene or polyethylene; a blend of two or more of a polyester, a nylon, a polyamide, or a polyolefin; a bi-component composite of any two of a polyester, a nylon, a polyamide, or a polyolefin; and the like. When thermoplastic fibers are used, the nonwoven fabric can be thermally bonded to apply a pattern to at least one surface of the nonwoven fabric. An example of a bi-component composite fiber includes, but is not limited to, a fiber having a core of one polymer and a sheath comprising a polymer different from the core polymer which completely, substantially, or partially encloses the core.

The nonwoven fabric can be formed of a majority of fibers comprising individual bast fibers with less than 10% by weight of the pectin content of the naturally occurring bundled bast fiber from which the individual bast fibers are derived. In another aspect, the individual bast fibers comprise less than 20% by weight of the pectin content of the naturally occurring bundled bast fiber.

A method of making a nonwoven fabric comprising substantially pectin-free, substantially individualized bast fibers having a mean length less than 6 mm comprises chemically treating naturally occurring fibers bundled with pectin to substantially remove pectin and form substantially individualized fibers. The method includes cutting, chopping, or by other means of reducing average fiber length to less than 6 mm. The substantially individualized fibers are dry-laid (or airlaid) to form a randomly arrayed fiber web (i.e., formed into an unbounded web in the dry state) and then bonded to form the nonwoven fabric. In one aspect, the web is bonded by a method employing hydroentangling. In addition, the hydroentangled web can be treated with an aqueous adhesive and exposed to heat to bond and dry the web. Also, the dry web can be bonded by mechanical needle punching and/or passing a heated air stream through the web. Alternatively, the dry web can be bonded by applying an aqueous adhesive to the unbonded web and exposing the web to heat. In another aspect, the web is formed by an air-laid method. In another aspect, the web can be formed by a coforming method. Yet, in another aspect, the web can be formed by a belt-creping method.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

DETAILED DESCRIPTION OF INVENTION

A nonwoven fabric comprising substantially pectin-free, individualized bast fibers having a mean length less than 6 (mm) is described herein. In another aspect, the nonwoven fabric comprises substantially pectin-free, individualized bast fibers having a mean length of about 4 mm. Typically, the nonwoven fabric comprises a majority the individualized bast fibers. The nonwoven fabric can include man-made fibers, such as petroleum based and reconstituted cellulosic fibers, and/or plant-based pulp fibers, such as wood pulp fibers. Among wood pulp fibers, any known papermaking fibers can be used, including softwood and hardwood fibers. Fibers, for example, may be chemically pulped or mechanically pulped, bleached or unbleached, virgin or recycled, high yield or low yield, and the like. Mercerized, chemically stiffened or cross-linked fibers may also be used. Bast fibers are extracted from, but not limited to, flax, hemp, jute, ramie, nettle, Spanish broom, kenaf plants. The nonwoven fabric of the present invention can employ bast fibers derived from one or any combination of the aforementioned plants.

Individualized bast fibers utilized in this invention are typically straight and are substantially pectin free. Conventional "individualized" bast fibers, however, may be only subjected to mechanical individualization, not chemical individualization required to substantially remove pectin content. Enzymatic individualization is a non-limiting example of chemical individualization. For example, individualized bast fibers have less than 10% by weight of the pectin content of the naturally occurring fibers from which the substantially pectin-free fibers are derived. In another aspect, individualized bast fibers have less than 15% by weight of the pectin content of the naturally occurring fibers from which the substantially pectin-free fibers are derived. Still, in another aspect, individualized bast fibers have less than 20% by weight of the pectin content of the naturally occurring fibers from which the substantially pectin-free fibers are derived. Still, in another aspect, individualized bast fibers have less than 0.1% by weight, less than 0.15% by weight, or less than 0.20% by weight, of the pectin content of the naturally occurring fibers from which the substantially pectin-free fibers are derived.

Typically, individualized bast fibers of the present invention have a mean length in a range between about 4 and less than 6 mm depending on the characteristics of the particular bast fibers and the cut length of the plant stalks prior to chemical processing. The bast fibers also may be cut or chopped post chemical processing (after being individualized). In one aspect, the individualized bast fibers have a mean length of at less than 6 mm. In another aspect, the individualized bast fibers have a mean length of about 4 mm.

The nonwoven fabric can further comprise staple fibers derived from one or more sources. Staple fibers include, but are not limited to, cellulosic fibers and thermoplastic fibers. An example of a cellulosic staple fiber comprises rayon. Thermoplastic fibers include the conventional polymeric fibers utilized in the nonwoven industry. Such fibers are formed from polymers which include, but are not limited to, a polyester such as polyethylene terephthalate; a nylon; a polyamide; a polyolefin such as polypropylene or polyethylene; a blend of two or more of a polyester, a nylon, a polyamide, or a polyolefin; a bi-component composite of any two of a polyester, a nylon, a polyamide, or a polyolefin; and the like. When thermoplastic fibers are used, the nonwoven fabric can be thermally bonded to apply a pattern to at least one surface of the nonwoven fabric. An example of a bi-component composite fiber includes, but is not limited to, a fiber having a core of one polymer and a sheath comprising a polymer different from the core polymer which completely, substantially, or partially encloses the core.

The nonwoven fabric can be formed of a majority of fibers comprising individual bast fibers with less than 10% by weight of the pectin content of the naturally occurring bundled bast fiber from which the individual bast fibers are derived. In another aspect, the individual bast fibers comprise less than 20% by weight of the pectin content of the naturally occurring bundled bast fiber.

In one aspect, the nonwoven fabric includes about 75 to about 90% bast fibers and about 10 to about 25% thermoplastic fibers. In another aspect, the nonwoven fabric includes about 75 to about 90% bast fibers and about 10 to about 25% wood pulp fibers. Yet, in another aspect, the nonwoven fabric includes about 60 to about 80% bast fibers and about 20 to about 40% thermoplastic continuous fibers.

A method of making a nonwoven fabric comprising substantially pectin-free, substantially individualized bast fibers having a mean length less than 6 mm comprises chemically treating naturally occurring fibers bundled with pectin to substantially remove pectin and form substantially individualized fibers. The substantially individualized fibers are dry-laid to form a randomly arrayed fiber web (i.e., formed into an unbounded web in the dry state) and then bonded to form the nonwoven fabric. In one aspect, the web is bonded by a method employing hydroentangling. In addition, the hydroentangled web can be treated with an aqueous adhesive and exposed to heat to bond and dry the web. Alternatively, the dry web can be bonded by applying an aqueous adhesive to the unbounded web and exposing the web to heat. In another aspect, the web is formed by an air-laid method. In another aspect, the web can be formed by a coforming method. Yet, in another aspect, the web can be formed by a belt-creping method.

As used herein, the term "plant-based fiber" means a fiber produced by and extracted from a plant as opposed to man-made fibers formed from cellulose. As used herein, the term "nonwoven" means a web or fabric having a structure of individual fibers or threads which are randomly interlaid, but not in an identifiable manner as in the case of a knitted or woven fabric. Examples of suitable nonwoven fabrics or webs include, but are not limited to, meltblown webs, spunbound webs, bonded carded webs, airlaid webs, coform webs, hydraulically entangled webs, and so forth.

Individualized bast fibers are typically straight and are substantially pectin free. For example, individualized bast fibers have less than 10% by weight of the pectin content of the naturally occurring fibers from which the substantially pectin-free fibers are derived. In another aspect, individualized bast fibers have less than 15% by weight of the pectin content of the naturally occurring fibers from which the substantially pectin-free fibers are derived. Still, in another aspect, individualized bast fibers have less than 20% by weight of the pectin content of the naturally occurring fibers from which the substantially pectin-free fibers are derived.

As stated above, in one aspect, nonwoven fabrics in accordance with the present invention comprise a majority fiber content that is individualized bast fibers. Naturally occurring bundled bast fibers are chemically treated to remove the pectin holding the bundles together and separate the naturally occurring fibers into individual bast fibers. Pectin acts as natural glue which holds the individual bast fibers in the bundle. By removing the pectin and separating the individual bast fibers, the individualized bast fibers can be formed into a web while in a dry state (see Example 1) or wet state (see Example 2) prior to subsequent bonding by suitable means to form a nonwoven textile fabric.

Hydroentanglement, also known as spunlacing, to form non-woven fabrics is well-known in the art. Non-limiting examples of the hydroentangling process are described in Canadian Patent No. 841,938, U.S. Pat. No. 3,485,706, and U.S. Pat. No. 5,958,186. U.S. Pat. Nos. 3,485,706 and 5,958,186, respectively, are incorporated herein in their entirety. Hydroentangling involves forming a dry-laid or wet-laid fiber web and thereafter entangling the fibers by employing very fine water jets under high pressure. For example, a plurality of rows of waterjets is directed towards the fiber web, which is disposed on a moving support, such as a wire (mesh). The entangled web is then dried. In addition to the substantially individualized bast fibers described herein, staple fibers and/or plant-based pulp fibers can be mixed with the bast fibers to form the nonwoven fabric. Nonwoven fabrics in accordance with the present invention can be formed of substantially individualized bast fibers, individualized bast fibers and staple fibers; bast fibers and pulp fibers; and bast fibers, staple fibers, and pulp fibers. Typically, when staple fibers and pulp fibers are present in the web, bast fibers comprise the majority of the nonwoven fabric.

After the dry-laid fiber web is formed, the fiber web is subjected to hydroentanglement with an energy flux of about 23,000 foot-pounds per square inch per second or higher, however, one skilled in the art would recognize that the desired energy flux would depend on many factors. The hydroentanglement is carried out using conventional techniques and with equipment supplied by machine manufacturers. After hydroentanglement, the material is pressed and dried and, optionally, wound onto a roll. The ready material is then converted in a known way to a suitable format and is packed.

Another common dry web forming process is air-laid or air-forming. This process employs only air flow, gravity, and centripetal force to deposit a stream of fibers onto a moving forming wire that conveys the fiber web to a web bonding process. Air-laid processes are described in PCT International Publication No. WO 03/099886 and U.S. Pat. Nos. 4,014,635 and 4,640,810, all of which are respectively incorporated herein in their entirety by reference. The air-laid process is effective at forming a uniform web of short fibers, e.g., typically less than 6 mm long, with low fiber to fiber cohesion and low potential for generating static. In accordance with the present invention, the majority fiber utilized in this air driven process is substantially pectin-free, individualized bast fiber. Since the individualized bast fibers can be cut into lengths less than 3 mm, the nonwoven fabric can be processed at high throughput. In addition, the air-formed nonwoven web can incorporate 10 to 20% of 4 to 6 mm long staple fibers, such as thermoplastic fibers that melt and bond the air-laid web together when the air-formed web is passed through ovens. It is possible to air-form a layer of 100% thermoplastic fiber in conjunction with the individualized bast fibers-based layer, however, the fiber throughput rate declines significantly with increasing fiber length. Furthermore, wood-based fibers due to their typical lengths of less than 3 mm can be readily mixed with the individualized bast fibers and the individualized bast fiber/staple fiber mixture.

Naturally occurring bundled bast fibers first are chemically treated to substantially remove pectin and form substantially pectin free, individualized bast fibers. Enzymatic treatment is a non-limiting example of a chemical treatment that can be used to substantially remove pectin. PCT International Publication No. WO 2007/140578, which is incorporated herein in its entirety by reference, describes a pectin removal technology that produces individualized hemp and flax fiber for application in the woven textile industry. Although individualized bast fiber is straight, it has fineness similar to cotton and has a length of at least 20 mm, which can be cut to appropriate length for the process employed to form the nonwoven fabric. The process to remove pectin described in WO 2007/140578 can be employed with the present invention.

Dry, individualized bast fibers can be incorporated into fiber bales. The fiber bales are opened by a bale opener and moved into a fiber accumulator. The accumulated fibers can be air-conveyed through a feed chute and then deposited as a fiber feed mat onto a forming wire. Moreover, staple fibers and/or pulp fibers can be mixed with the individualized bast fibers prior to depositing onto the forming wire. The air-conveyed process randomizes the orientation of the fibers when they are collected on the forming wire. The fiber web can then be transferred to web bonding equipment, which is discussed below, to form the nonwoven fabric.

As discussed above, the dry web can be bonded by hydroentangling. In addition, the hydroentangled web can be treated with an aqueous adhesive and exposed to heat to bond and dry the web. Also, the dry web can be bonded by mechanical needle punching and/or passing a heated air stream through the web. Bi-component fibers may be used in these processes. Alternatively, the dry web can be bonded by applying an aqueous adhesive to the unbounded web and exposing the web to heat.

The fabrics of the present invention may be formed from a single layer or multiple layers. In the case of multiple layers, the layers are generally positioned in a juxtaposed or surface-to-surface relationship and all or a portion of the layers may be bound to adjacent layers. Nonwoven webs of the present invention may also be formed from a plurality of separate nonwoven webs wherein the separate nonwoven webs may be formed from single or multiple layers. In those instances where the nonwoven web includes multiple layers, the entire thickness of the nonwoven web may be subjected to a binder application or each individual layer may be separately subjected to a binder application and then combined with other layers in a juxtaposed relationship to form the finished nonwoven web.

Thermal bonding is also referred to as calendar bonding, point bonding, or pattern bonding, and is used to bond a fiber web to form a nonwoven fabric. Thermal bonding can also incorporate a pattern into the fabric. Thermal bonding is described in PCT International Publication No. WO/2005/025865, which is incorporated herein by reference in its entirety. Thermal bonding requires incorporation of thermoplastic fibers into the fiber web. Examples of thermoplastic fibers are discussed above. In thermal bonding, the fiber web is bonded under pressure by passing through heated calendar rolls, which can be embossed with a pattern that transfers to the surface of the fiber web. During thermal bonding, the calendar rolls are heated to a temperature at least between the glass transition temperature ($T_g$) and the melting temperature ($T_m$) of the thermoplastic material.

As discussed above, the dry-laid web can be formed in coforming process. A coform nonwoven web or fabric can be employed in a wide variety of applications, including dry and wet wipes, wet mops, and absorbent dry mops. As used herein, a "coform nonwoven fabric" means a composite fabric containing a mixture or stabilized matrix of thermoplastic filaments and substantially pectin-free, individualized bast fibers. Other fibers, such as wood pulp, can be included as well. Coform nonwoven fabric can be made by a process in which at least one melt-blown die head is arranged near a chute through which the individualized bast fibers are added to the web while it is forming. Processes used to make coformed nonwoven fabrics are described in U.S. Pat. Nos. 5,350,624; 4,100,324; 4,469,734; and 4,818,464, and U.S. Patent Application Publication No. 2003/0211802, all of which are respectively incorporated herein by reference in their entirety. In one aspect, the thermoplastic filaments are thermoplastic meltblown filaments. Further, the nonwoven fabric can have tufts extending outwardly from a surface of the fabric. U.S. Patent Application Publication No. 2003/0211802 describes a coforming process for making a nonwoven fabric having tufts.

Meltblown fibers are formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which can be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241, which is incorporated herein by reference in its entirety. Meltblown fibers are microfibers, which can be continuous or discontinuous, and are generally smaller than 10 microns in average diameter. Meltblown is also covers other processes in which a high velocity gas (generally air) is used to aid in the formation of the filaments, such as melt spraying or centrifugal spinning.

The thermoplastic filaments employed to make the coform nonwoven web of the present invention can be meltblown filaments prepared from thermoplastic polymers. Suitable thermoplastic polymers useful in the present invention include, but are not limited to, polyolefins, polyesters, polyamides, polycarbonates, polyurethanes, polyvinylchloride, polytetrafluoroethylene, polystyrene, polyethylene terephthalate, biodegradable polymers such as polyacetic acid and copolymers and blends thereof. Suitable polyolefins include, but are not limited to, polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly (1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof.

Many spunbond and meltblown grade polyolefins are available for fiber production, for example polyethylenes such as Dow Chemical's ASPUN 6811A linear low-density polyethylene, 2553 LLDPE and 25355 and 12350 high-density polyethylene. The polyethylenes have melt flow indices in g/10 min. at 190° F. and a load of 2.16 kg, of about 26, 40, 25 and 12, respectively, and can be typically used in a conventional spunbond process. Melt-blown grade fiber forming polypropylenes include, for example, Basell's PF-015 polypropylene. Many other polyolefins are commercially available and generally can be used in the present invention.

Examples of polyamides and their methods of synthesis may be found in "Polyamide Resins" by Don E. Floyd (Library of Congress Catalog number 66-20811, Reinhold Publishing, N.Y., 1966). Commercially available polyamides which can be employed in the coformed nonwoven fabric include, but are not limited to, nylon 6, nylon-6,6, nylon-11, and nylon-12. In addition, a compatible tackifying resin may be added to the extrudable compositions described above to provide tackified materials that autogenously bond or which require heat for bonding. Any tackifier resin can be used which is compatible with the polymers and can withstand the high processing (e.g., extrusion) temperatures. If the polymer is blended with processing aids such as, for example, polyolefins or extending oils, the tackifier resin should also be compatible with those processing aids. Generally, hydrogenated hydrocarbon resins are employed as tackifying resins due to their property of temperature stability. REGALREZ® and ARKON® P series tackifiers are examples of hydrogenated hydrocarbon resins. ZONA-TAC® 501 Lite is an example of a terpene hydrocarbon. REGALREZ® hydrocarbon resins are available from Hercules Incorporated. ARKON® P series resins are available from Arakawa Chemical (USA) Incorporated. The tackifying resins are disclosed in U.S. Pat. No. 4,787,699, which is incorporated herein in its entirety by reference. Other tackifying resins which are compatible with the other components of the composition and can withstand the high processing temperatures can also be used.

The meltblown filaments may be mono-component fibers, meaning fibers prepared from one polymer component, multi-constituent fibers, or multicomponent fibers. The multicomponent filaments may, for example, have either of an A/B or A/B/A side-by-side configuration, or a sheath-core configuration, wherein one polymer component surrounds another polymer component. Multi-constituent fibers are to fibers which have been formed from at least two polymers extruded from the same extruder as a blend or mixture. Multi-constituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Multicomponent fibers are fibers or filaments which have been formed from at least two polymers extruded from separate extruders but spun together to form one fiber. Multicomponent fibers are also sometimes referred to as "conjugate" or "bicomponent" fibers or filaments. The term "bicomponent" means there are two polymeric components making up the fibers. The polymers are usually different from each other, although conjugate fibers may be prepared from the same polymer, if the polymer in each component is different from one another in some physical property, such as, for example, melting point or the softening point. In all cases, the polymers are arranged in substantially constantly positioned distinct zones across the cross-section of the multicomponent fibers or filaments and extend continuously along the length of the multicomponent fibers or filaments. The configuration of such a multicomponent fiber may be, for example, a sheath/core arrangement, wherein one polymer is surrounded by another, a side-by-side arrangement, a pie arrangement or an "islands-in-the-sea" arrangement.

The coform nonwoven fabric of the present invention can be made as follows:
 a. providing at least one stream of meltblown filaments;
 b. providing at least one stream containing the substantially pectin-free, substantially individualized bast fibers;
 c. converging the at least one stream containing bast fibers with the at least one stream of meltblown filaments to form a composite stream;
 d. depositing the composite stream onto a forming surface as a matrix of meltblown filaments and the bast fibers, wherein the forming surface is optionally a shaped surface such that a three-dimensional tufted coform nonwoven fabric is produced;
 e. optionally applying a pressure differential to the matrix while on the forming surface to form a nonwoven web having an array of projections and land areas corresponding to the shaped forming surface, if the shaped forming surface is present;
 f. separating the nonwoven web from the forming surface; and
 g. optionally embossing an aesthetically pleasing pattern on the web by passing through patterned embossing rolls The forgoing steps may be practiced in a variety of manners including one of the following methods, which illustrate steps that can be used in accordance with the present invention to form the tufted nonwoven web.

In another method, the coform nonwoven fabric of the present invention is made by a method including:
 1. providing a first stream of meltblown filaments;
 2. providing a second stream of meltblown filaments;
 3. converging the first stream of meltblown filaments and the second stream of meltblown filaments in an intersecting relationship to form an impingement zone;
 4. introducing a stream containing the substantially pectin-free, substantially individualized bast fibers between the first and second streams of the meltblown filaments at or near the impingement zone to form a composite stream;
 5. depositing the composite stream onto a forming surface as a matrix of meltblown filaments and the bast fibers, wherein the forming surface is optionally a shaped surface such that a three-dimensional tufted coform nonwoven fabric is produced;
 6. optionally applying a pressure differential to the matrix while on the forming surface to form a nonwoven web having an array of projections and land areas corresponding to the shaped forming surface, if the shaped forming surface is present;
 7. separating the nonwoven web from the forming surface; and
 8. optionally, embossing an aesthetically pleasing pattern on the web by passing through patterned embossing rolls.

As discussed above, the dry-laid web, or wet-laid web, can also be subjected to a belt-creped process. A belt-creped process which can be employed to make the nonwoven fabric of the present invention is disclosed in U.S. Pat. No. 8,293,072, which is incorporated herein in its entirety by reference.

By using the belt-creped process, a nonwoven fabric comprising the substantially pectin-free, substantially individualized bast fibers can be made which is a variable basis weight product that exhibits, among other properties, caliper or bulk. The belt-creped formed nonwoven fabric has a repeating structure of arched raised portions that define hollow areas on their opposite side. The raised arched portions or domes have a relatively high local basis weight interconnected with a network of densified fiber. Transition areas bridging the connecting regions and the domes include upwardly and optionally inwardly inflected consolidated fiber. Generally speaking, the furnish is selected and the steps of belt creping, applying a vacuum and drying are controlled such that a dried web is formed having a plurality of fiber-enriched hollow domed regions protruding from the upper surface of the sheet, the hollow domed regions having a sidewall of relatively high local basis weight formed along at least a leading edge thereof, and connecting regions forming a network interconnecting the fiber-enriched hollow domed regions of the sheet, wherein consolidated groupings of bast fibers extend upwardly from the connecting regions into the sidewalls of the fiber-enriched hollow domed regions along at least the leading edge thereof. Such consolidated groupings of bast fibers are present at least at the leading and trailing edges of the domed areas. In many cases, the consolidated groupings of bast fibers form saddle shaped regions extending at least partially around the domed areas. These regions can impart bulk accompanied by high roll firmness to the nonwoven fabric, aiding absorbency. Further, the network regions form a densified (but not so highly densified as to be consolidated) reticulum imparting enhanced strength to the nonwoven fabric.

The creping belt has a transfer surface with perforations formed from a polymer material, such as polyester. In various aspects, the nonwoven fabric is characterized by a fiber matrix that is rearranged by belt creping from an apparently random wet-pressed structure to a shaped structure with fiber-enriched regions and/or a structure with fiber orientation and shape that defines a hollow dome-like repeating pattern in the web. In still further aspects of the invention, non-random cross machine direction orientation bias in a regular pattern is imparted to the fiber in the web. Belt creping occurs under pressure in a creping nip while the web is at a consistency between about 30 and 60 percent.

The nonwoven fabric of the present invention can be incorporated into a laminate comprising the nonwoven fabric and a film, or other nonwoven. Laminates can be used in a wide variety of applications, such outer-covers for personal care products and absorbent articles, for example diapers, training pants, incontinence garments, feminine hygiene products, wound dressings, bandages, and the like.

To form a laminate, an adhesive is applied to a support surface of the nonwoven fabric or a surface of the film. Examples of suitable adhesives include sprayable latex, polyalphaolefin (commercially available as Rextac 2730 and Rextac 2723 from Huntsman Polymers, Houston, Tex.), and ethylene vinyl acetate. Additional commercially available adhesives include, but are not limited to, those available from Bostik Findley, Inc., Wauwatosa, Wis. Then, a film is fed onto the forming wire on top of the nonwoven fabric. Before application to the nonwoven fabric, the film is stretched as desired. The nonwoven fabric and film are combined and compressed in a nip to form the laminate. Although not required for pressure sensitive adhesives, the nip can be maintained at a desired adhesive bonding temperature suitable for the adhesive employed, e.g. heat activated adhesions. The laminate can be slit, directed to a winder, or directed to further processing.

In addition to applying a film to the nonwoven fabric, another fabric can be bonded to the nonwoven fabric, which can be, for example another nonwoven fabric or a woven fabric. The nonwoven fabric can be a nonwoven fabric made in accordance with the present invention. An adhesive can be applied to either the nonwoven fabric or the another fabric before nipping to form the laminate.

The films used in laminates can include, but are not limited to, polyethylene polymers, polyethylene copolymers, polypropylene polymers, polypropylene copolymers, polyurethane polymers, polyurethane copolymers, styrenebutadiene copolymers, or linear low density polyethylene. Optionally, a breathable film, e.g. a film comprising calcium carbonate, can be employed to form the laminate. Generally, a film is "breathable" if it has a water vapor transmission rate of at least 100 grams/square meter/24 hours, which can be measured, for example, by the test method described in U.S. Pat. No. 5,695,868, which is incorporated herein in its entirety by reference. Breathable films, however, are not limited to films comprising calcium carbonate. Breathable films can include any filler. As used herein, "filler" is meant to include particulates and other forms of materials which will not chemically interfere with or adversely affect the film, but will be substantially uniformly dispersed throughout the film. Generally, fillers are in particulate form and spherical in shape, with average diameters in the range between about 0.1 micrometers to about 7 micrometers. Fillers include, but are not limited to, organic and inorganic fillers.

The naturally occurring bundled bast fibers and the individualized bast fibers utilized in the present invention, in addition to visual and tactile inspection, can be distinguished by quantified measuring of the relative amounts of pectin present in the bundled versus the individualized bast fibers. A chemical test has been developed to make this relative quantification, which is based on the method described in WO 2007/140578. The test procedure is as follows:

Approximately 30 mg of fiber is exposed to 20 µL of Novozyme Pectinase from *Aspergillus niger* (50× dilution) in 800 µL of a 100 mM sodium citrate buffer that is adjusted to pH 4.5 with hydrochloric acid. The solution is heated to 40° C. for 1 hour. After heating, 50 µL of the liquid solution is removed and added to 1 mL of 10 mM sodium hydroxide. A 3.0 mL aliquot of a 0.5% solution of 4-hydroxy-benzhydrazide (prepared as a 5% solution in 0.5 M hydrochloric acid and diluted with 0.5 M sodium hydroxide to give a 0.5% solution) is added to the solution which is then heated in boiling water for 5 minutes. After cooling, the absorbance of the mixture is measured at 410 nm.

Standards of galacturonic acid are prepared in water, and 50 µL of these solutions are added to 1 mL aliquots of 10 mM sodium hydroxide. Colorimetric analysis of the reducing sugar is followed in the same manner as above.

Table 1 reports the results of a test in terms of the percentage of reduced sugar extracted from the fibers into an aqueous solution. The reduced sugar is pectin in its extracted form. Therefore, the relative fraction of reduced sugar in the aqueous solution correlates with the relative fraction of pectin attached to the bast fibers prior to the extraction test. As indicated in Table 1, individualized bast fibers after enzyme processing have less than 0.1% reduced sugar.

TABLE 1

Relative reduced sugar/pectin content of bast
fibers before and after enzymatic treatment

|  | Reduced Sugar Percentage (%)* |
|---|---|
| Flax bast fiber bundles before enzyme processing | 1.1 |
| Individualized flax bast fibers after enzyme processing | Less Than 0.1 |

*Reduced sugar extraction is a proportional indicator for pectin content

Pilot trials investigated hemp bast fibers that had only been partially individualized by the pectin removal process described in PCT International Publication No. WO 2007/140578. The results presented in Table 2 show an inverse correlation between the pectin content of the bast fibers and the strength of the resulting nonwoven fabric. Thus, pectin content in a collection of bast fibers can be employed as a predictor of the performance of a nonwoven web comprised of those fibers.

TABLE 2

Physical Properties and Relative Pectin Content of Inventive Fabrics

| Test | Batch 1 Herringbone Pattern (100% Hemp Bast Fiber) | Batch 2 Herringbone Pattern (100% Hemp Bast Fiber) | Batch 3 Herringbone Pattern (100% Hemp Bast Fiber) |
|---|---|---|---|
| Reduced Sugar Content from Pectin Extraction (%) | 0.1 | 0.3 | 0.6 |
| Basis Weight (gsm) | 138.1 | 114.5 | 110.2 |
| MD Dry Tensile Strength (g/inch) | 9570 | 2490 | 1480 |
| CD Dry Tensile Strength (g/inch) | 1790 | 370 | 220 |
| MD/CD Dry Ratio | 5.3 | 6.7 | 6.7 |
| MD Wet Tensile Strength (g/inch) | 8720 | 1370 | 1440 |
| CD Wet Tensile Strength (g/inch) | 2210 | 230 | 200 |
| MD/CD Wet Ratio | 3.9 | 6.0 | 7.2 |

The nonwoven fabric of the present invention can be incorporated into a variety of products. Non-limiting examples of products include wipers (or wipes), such as wet wipers, dry wipers, or impregnated wipers, which include personal care wipers, household cleaning wipers, and dusting wipers. Personal care wipers can be impregnated with, e.g., emollients, humectants, fragrances, and the like. Household cleaning wipers or hard surface cleaning wipers can be impregnated with, e.g., surfactants (for example, quaternary amines), peroxides, chlorine, solvents, chelating agents, antimicrobials, fragrances, and the like. Dusting wipers can be impregnated with, e.g., oils.

Non-limiting examples of wipers include baby wipes, cosmetic wipes, perinea wipes, disposable washcloths, household cleaning wipes, such as kitchen wipes, bath wipes, or hard surface wipes, disinfecting and germ removal wipes, specialty cleaning wipes, such as glass wipes, mirror wipes, leather wipes, electronics wipes, lens wipes, and polishing wipes, medical cleaning wipes, disinfecting wipes, and the like. Additional examples of products include sorbents, medical supplies, such as surgical drapes, gowns, and wound care products, personal protective products for industrial applications, such as protective coveralls, sleeve protectors, and the like, protective coverings for automotive applications, and protective coverings for marine applications. The nonwoven fabric can be incorporated into absorbent cores, liners, outer-covers, or other components of personal care articles, such as diapers (baby or adult), training pants, feminine care articles (pads and tampons) and nursing pads. Further, the nonwoven fabric can be incorporated into fluid filtration products, such air filters, water filters, and oil filters, home furnishings, such as furniture backing, thermal and acoustic insulation products, agricultural application products, landscaping application products, and geotextile application products.

Examples of regenerated cellulose include, but are not limited to, rayon, Lyocell®, (e.g., TENCEL®), Viscose®, or any combination thereof. TENCEL® and Viscose® are commercially available from Lenzing Aktiengesellschaft, Lenzing, Austria.

As mentioned above, the nonwoven fabric can be a wet wipe. The wet wipe can be pre-moistened with a wetting composition, which can include at least one additive. The wetting composition can be any solution, including, but not limited to, an aqueous solution comprising at least one additive. Non-limiting examples of suitable additives are provided below. The wetting composition can be disposed on or impregnated within the nonwoven fabric by any method. Examples of such methods include, but are not limited to, soaking the nonwoven fabric in the wetting composition and spraying the wetting composition onto the nonwoven fabric.

As indicated above, a variety of additives can be employed with the non-woven fabric products described herein. Suitable additives include, but are not limited to: skin-care additives; odor control agents; detackifying agents if a binder is present in the non-woven fabric to reduce the tackiness of the binder; particulates; antimicrobial agents; preservatives; wetting agents and cleaning agents such as detergents, surfactants, and some silicones; emollients; surface feel modifiers for improved tactile sensation (e.g., lubricity) on the skin; fragrance; fragrance solubilizers; opacifiers; fluorescent whitening agents; UV absorbers; pharmaceuticals; and pH control agents, such as malic acid or potassium hydroxide.

Skin-care additives provide one or more benefits to the user, such as a reduction in the probability of having diaper rash and/or other skin damage caused by fecal enzymes. These enzymes, particularly trypsin, chymotrypsin and elastase, are proteolytic enzymes produced in the gastrointestinal tract to digest food. In infants, for example, the feces tend to be watery and contain, among other materials, bacteria, and some amounts of un-degraded digestive enzymes. These enzymes, if they remain in contact with the skin for any appreciable period of time, may cause an irritation that is uncomfortable in itself and can predispose the skin to infection by microorganisms. As a countermeasure, skin-care additives include, but are not limited to, the enzyme inhibitors and sequestrants. The wetting composition can contain less than about 5 weight percent of skin-care additives based on the total weight of the wetting composition. More specifically, the wetting composition can contain from about 0.01 weight percent to about 2 weight percent of skin-care additives. Even more specifically, the wetting composition can contain from about 0.01 weight percent to about 0.05 weight percent of skin-care additives.

A variety of skin-care additives can be added to the wetting composition and the pre-moistened wipes of the present invention or included therein. For example, skin-care additives in the form of particles can be added to serve as fecal enzyme inhibitors, offering potential benefits in the reduction of diaper rash and skin damage caused by fecal enzymes. U.S. Pat. No. 6,051,749, which is incorporated herein by reference in its entirety, discloses organophilic clays in a woven or nonwoven web described as being useful for inhibiting fecal enzymes. Such materials can be used in the present invention, including reaction products of a long chain organic quaternary ammonium compound with one or more of the following clays: montmorillonite, bentonite, beidellite, hectorite, saponite, and stevensite.

Other known enzyme inhibitors and sequestrants can be used as skin-care additives in the wetting composition of the present invention, including those that inhibit trypsin and other digestive or fecal enzymes, and inhibitors for urease. For example, enzyme inhibitors and anti-microbial agents may be used to prevent the formation of odors in body fluids. For example, urease inhibitors, which are also said to play a role in odor absorption, are disclosed in PCT International Publication No. 98/26808, which is incorporated herein by reference in its entirety. Such inhibitors can be incorporated into the wetting composition and the pre-moistened wipes of the present invention and include transition metal ions and their soluble salts, such as silver, copper, zinc, ferric, and aluminum salts. The anion may also provide urease inhibition, such as borate, phytate, etc. Compounds of potential value include, but are not limited to, silver chlorate, silver nitrate, mercury acetate, mercury chloride, mercury nitrate, copper metaborate, copper bromate, copper bromide, copper chloride, copper dichromate, copper nitrate, copper salicylate, copper sulfate, zinc acetate, zinc borate, zinc phytate, zinc bromate, zinc bromide, zinc chlorate, zinc chloride, zinc sulfate, cadmium acetate, cadmium borate, cadmium bromide, cadmium chlorate, cadmium chloride, cadmium formate, cadmium iodate, cadmium iodide, cadmium permanganate, cadmium nitrate, cadmium sulfate, and gold chloride.

Other salts known to have urease inhibition properties include ferric and aluminum salts, such as the nitrates, and bismuth salts. Other urease inhibitors include hydroxamic acid and its derivatives; thiourea; hydroxylamine; salts of phytic acid; extracts of plants of various species, including various tannins, e.g. carob tannin, and their derivatives such as chlorogenic acid derivatives; naturally occurring acids such as ascorbic acid, citric acid, and their salts; phenyl phosphoro diamidate/diamino phosphoric acid phenyl ester; metal aryl phosphoramidate complexes, including substituted phosphorodiamidate compounds; phosphoramidates without substitution on the nitrogen; boric acid and/or its salts, including especially, borax, and/or organic boron acid compounds; the compounds disclosed in European Patent Application 408,199; sodium, copper, manganese, and/or zinc dithiocarbamate; quinones; phenols; thiurams; substituted rhodanine acetic acids; alkylated benzoquinones; formamidine disulphide; 1:3-diketones maleic anhydride; succinamide; phthalic anhydride; behenic acid; N,N-dihalo-2-imidazolidinones; N-halo-2-oxazolidinones; thio- and/or acyl-phosphoryltnamide and/or substituted derivatives thereof, thiopyridine-N-oxides, thiopyridines, and thiopyrimidines; oxidized sulfur derivatives of diaminophosphinyl compounds; cyclotriphosphazatriene derivatives; bromo-nitro compounds; S-aryl and/or alkyl diamidophosphorothiolates; diaminophosphinyl derivatives; mono- and/or polyphosphorodiamide; alkoxy-1,2-benzothiazine compounds; ortho-diaminophosphinyl derivatives of oximes; 5-substituted-benzoxathiol-2-ones; N(diammophosphinyl)arylcarboxamides; etc.

Many other skin-care additives may be incorporated into the wetting composition and pre-moistened wipes of the present invention, including, but not limited to, sun blocking agents and UV absorbers, acne treatments, pharmaceuticals, baking soda (including encapsulated forms thereof), vitamins and their derivatives such as Vitamins A or E, botanicals such as witch hazel extract and aloe vera, allantoin, emollients, disinfectants, hydroxy acids for wrinkle control or anti-aging effects, sunscreens, tanning promoters, skin lighteners, deodorants and anti-perspirants, ceramides for skin benefits and other uses, astringents, moisturizers, nail polish removers, insect repellants, antioxidants, antiseptics, anti-inflammatory agents and the like. Useful materials for skin care and other benefits are listed in McCutcheon's 1999, Vol. 2: Functional Materials, MC Publishing Company, Glen Rock, N.J. Many useful botanicals for skin care are provided by Active Organics, Lewisville, Tex.

Suitable odor control additives for use in the wetting composition and pre-moistened wipes of the present invention include, but are not limited to, zinc salts; talc powder; encapsulated perfumes (including microcapsules, macrocapsules, and perfume encapsulated in liposomes, vessicles, or microemulsions); chelants, such as ethylenediamine tetraacetic acid; zeolites; activated silica, activated carbon granules or fibers; activated silica particulates; polycarboxylic acids, such as citric acid; cyclodextrins and cyclodextrin derivatives; chitosan or chitin and derivatives thereof; oxidizing agents; antimicrobial agents, including silver-loaded zeolites; triclosan; kieselguhr; and mixtures thereof. In addition to controlling odor from the body or body wastes, odor control strategies can also be employed to mask or control any odor of the treated substrate. Typically, the wetting composition contains less than about 5 weight percent of odor control additives based on the total weight of the wetting composition. In another aspect, the wetting composition contains from about 0.01 weight percent to about 2 weight percent of odor control additives. Yet, in another aspect, the wetting composition contains from about 0.03 weight percent to about 1 weight percent of odor control additives.

In one embodiment of the present invention, the wetting composition and/or pre-moistened wipes comprise derivatized cyclodextrins, such as hydroxypropyl beta-cyclodextrin in solution, which remain on the skin after wiping and provide an odor-absorbing layer. In other embodiments, the odor source is removed or neutralized by application of an odor-control additive, exemplified by the action of a chelant that binds metal groups necessary for the function of many proteases and other enzymes that commonly produce an odor. Chelating the metal group interferes with the enzyme's action and decreases the risk of malodor in the product.

Principles for the application of chitosan or chitin derivatives to nonwoven webs and cellulosic fibers are described by S. Lee et al. in "Antimicrobial and Blood Repellent Finishes for Cotton and Nonwoven Fabrics Based on Chitosan and Fluoropolymers," Textile Research Journal, 69(2); 104-112, February 1999.

If a binder is employed in the non-woven fabric, detackifying agents can be used in the wetting composition to reduce the tackiness of the binder. Suitable detackifiers include any substance known in the art to reduce tack between two adjacent fibrous sheets treated with an adhesive-like polymer or any substance capable of reducing the tacky feel of an adhesive-like polymer on the skin. Detackifiers can be applied as solid particles in dry form, as a suspension or as a slurry of particles. Deposition can be by spray, coating, electrostatic deposition, impingement, filtration (i.e., a pressure differential drives a particle-laden gas phase through the substrate, depositing particles by a filtration mechanism), and the like, and can be applied uniformly on one or more surfaces of the substrate or may be applied in a pattern (e.g., repeating or random patterns) over a portion of the surface or surfaces of the substrate. The detackifier can be present throughout the thickness of the substrate, but may be concentrated at one or both surfaces, and may be substantially only present on one or both surfaces of the substrate.

Specific detackifiers include, but are not limited to, powders, such as talc powder, calcium carbonate, mica; starches, such as corn starch; lycopodium powder; mineral fillers, such as titanium dioxide; silica powder; alumina; metal oxides in general; baking powder; and the like. Polymers and other additives having low surface energy may also be used, including a wide variety of fluorinated polymers, silicone additives, polyolefins and thermoplastics, waxes, debonding agents known in the paper industry including compounds having alkyl side chains such as those having 16 or more carbons, and the like. Compounds used as release agents for molds and candle making may also be considered, as well as, dry lubricants and fluorinated release agents.

The wetting composition of the present invention can be further modified by the addition of solid particulates or microparticulates. Suitable particulates include, but are not limited to, mica, silica, alumina, calcium carbonate, kaolin, talc, and zeolites. The particulates can be treated with stearic acid or other additives to enhance the attraction or bridging of the particulates to the binder system, if desired. Also, two-component microparticulate systems, commonly used as retention aids in the papermaking industry, can be used. Such two-component microparticulate systems generally comprise a colloidal particle phase, such as silica particles, and a water-soluble cationic polymer for bridging the particles to the fibers of the web to be formed. The presence of particulates in the wetting composition can serve one or more useful functions, such as (1) increasing the opacity of the pre-moistened wipes; (2) modifying the rheology or reducing the tackiness of the pre-moistened wipe; (3) improving the tactile properties of the wipe; or (4) delivering desired agents to the skin via a particulate carrier, such as a porous carrier or a microcapsule. Typically, the wetting composition contains less than about 25 weight percent of particulate based on the total weight of the wetting composition. In another aspect, the wetting composition contains from about 0.05 weight percent to about 10 weight percent of microparticulate. Yet, in another aspect, the wetting composition contains from about 0.1 weight percent to about 5 weight percent of microparticulate.

Microcapsules and other delivery vehicles can also be used in the wetting composition of the present invention to provide skin-care agents; medications; comfort promoting agents, such as eucalyptus; perfumes; odor control additives; vitamins; powders; and other additives to the skin of the user. For example, the wetting composition can contain up to about 25 weight percent of microcapsules or other delivery vehicles based on the total weight of the wetting composition. In another aspect, the wetting composition can contain from about 0.05 weight percent to about 10 weight percent of microcapsules or other delivery vehicles. Yet, in another aspect, the wetting composition can contain from about 0.2 weight percent to about 5.0 weight percent of microcapsules or other delivery vehicles.

Microcapsules and other delivery vehicles are well known in the art. For example, POLY-PORE® E200 (Chemdal Corp., Arlington Heights, Ill.), is a delivery agent comprising soft, hollow spheres that can contain an additive at over 10 times the weight of the delivery vehicle. Known additives reported to have been used with POLY-PORE® E200 include, but are not limited to, benzoyl peroxide, salicylic acid, retinol, retinol palmitate, octyl methoxycinnamate, tocopherol, silicone compounds (DC 435), and mineral oil. Another delivery vehicle which can be employed with non-woven fabric is a sponge-like material marketed as POLY-PORE® L200, which is reported to have been used with silicone (DC 435) and mineral oil. Other known delivery systems include cyclodextrins and their derivatives, liposomes, polymeric sponges, and spray-dried starch. Additives present in microcapsules are isolated from the environment and the other agents in the wetting composition until the wipe is applied to the skin, whereupon the microcapsules break and deliver their load to the skin or other surfaces.

The wetting composition of the present invention can contain preservatives and/or anti-microbial agents. Several preservatives and/or anti-microbial agents useful in the present invention include, but are not limited to, Mackstat H 66 (available from McIntyre Group, Chicago, Ill.), DMDM hydantoin (e.g., Glydant Plus™, Lonza, Inc., Fair Lawn, N.J.), iodopropynyl butylcarbamate, Kathon (Rohm and Hass, Philadelphia, Pa.), methylparaben, propylparaben, 2-bromo-2-nitropropane-1,3-diol, benzoic acid, and the like. Typically, the wetting composition contains less than about 2 weight percent on an active basis of preservatives and/or antimicrobial agents based on the total weight of the wetting composition. In another aspect, the wetting composition contains from about 0.01 weight percent to about 1 weight percent of preservatives and/or anti-microbial agents. Yet, in another aspect, the wetting composition contains from about 0.01 weight percent to about 0.5 weight percent of preservatives and/or anti-microbial agents.

A variety of wetting agents and/or cleaning agents can be used in the wetting composition of the present invention. Suitable wetting agents and/or cleaning agents include, but are not limited to, detergents and nonionic, amphoteric, and anionic surfactants, especially amino acid-based surfactants. Amino acid-based surfactant systems, such as those derived from amino acids L-glutamic acid and other natural fatty acids, offer pH compatibility to human skin and good cleansing power, while being relatively safe and providing improved tactile and moisturization properties compared to other anionic surfactants. One function of the surfactant is to improve wetting of the dry substrate with the wetting composition. Another function of the surfactant can be to disperse bathroom soils when the pre-moistened wipe contacts a soiled area and to enhance their absorption into the substrate. The surfactant can further assist in make-up removal, general personal cleansing, hard surface cleansing, odor control, and the like.

One commercial example of an amino-acid based surfactant is acylglutamate, marketed under the Amisoft name by Ajinomoto Corp., Tokyo, Japan. Typically, the wetting composition contains less than about 3 weight percent of wetting agents and/or cleaning agents based on the total weight of the wetting composition. In another aspect, the wetting composition contains from about 0.01 weight percent to about 2 weight percent of wetting agents and/or cleaning agents. Yet, in another aspect, the wetting composition contains from about 0.1 weight percent to about 0.5 weight percent of wetting agents and/or cleaning agents.

In addition to amino-acid based surfactants, a wide variety of surfactants can be used in the present invention. Suitable non-ionic surfactants include, but are not limited to, the condensation products of ethylene oxide with a hydrophobic (oleophilic) polyoxyalkylene base formed by the condensation of propylene oxide with propylene glycol. The hydrophobic portion of these compounds desirably has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include commercially-available Pluronic surfactants (BASF Wyandotte Corp.), such as those in which the polyoxypropylene ether has a molecular weight of about 1500-3000 and the polyoxyethylene content is about 35-55% of the molecule by weight, i.e. Pluronic L-62.

Other useful nonionic surfactants include, but are not limited to, the condensation products of C8-C22 alkyl alcohols with 2-50 moles of ethylene oxide per mole of alcohol. Examples of compounds of this type include the condensation products of secondary alkyl alcohols with 3-50 moles of ethylene oxide per mole of alcohol, which are commercially-available as the Poly-Tergent SLF series from Olin Chemicals or the TERGITOL® series from Union Carbide, i.e. TERGITOL® 25-L-7, which is formed by condensing about 7 moles of ethylene oxide with a C12-C15 alkanol.

Other nonionic surfactants, which can be employed in the wetting composition of the present invention, include the ethylene oxide esters of $C_6$-C12 alkyl phenols such as (nonylphenoxy)polyoxyethylene ether. Particularly useful are the esters prepared by condensing about 8-12 moles of ethylene oxide with nonylphenol, i.e. the IGEPAL® CO series (GAF Corp.). Further non-ionic surface active agents include, but are not limited to, alkyl polyglycosides (APG), derived as a condensation product of dextrose (D-glucose) and a straight or branched chain alcohol. The glycoside portion of the surfactant provides a hydrophile having high hydroxyl density, which enhances water solubility. Additionally, the inherent stability of the acetal linkage of the glycoside provides chemical stability in alkaline systems. Furthermore, unlike some non-ionic surface active agents, alkyl polyglycosides have no cloud point, allowing one to formulate without a hydrotrope, and these are very mild, as well as readily biodegradable non-ionic surfactants. This class of surfactants is available from Horizon Chemical under the trade names of APG-300, APG-350, APG-500, and APG-500.

Silicones are another class of wetting agents available in pure form, or as microemulsions, macroemulsions, and the like. One exemplary non-ionic surfactant group is the silicone-glycol copolymers. These surfactants are prepared by adding poly(lower)alkylenoxy chains to the free hydroxyl groups of dimethylpolysiloxanols and are available from the Dow Corning Corp as Dow Corning 190 and 193 surfactants (CTFA name: dimethicone copolyol). These surfactants function, with or without any volatile silicones used as solvents, to control foaming produced by the other surfactants, and also impart a shine to metallic, ceramic, and glass surfaces.

Anionic surfactants can be used in the wetting compositions of the present invention. Anionic surfactants are useful due to their high detergency include anionic detergent salts having alkyl substituents of 8 to 22 carbon atoms such as the water-soluble higher fatty acid alkali metal soaps, e.g., sodium myristate and sodium palmitate. A preferred class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group, with examples available as the Bio-Soft series, i.e. Bio-Soft D-40 (Stepan Chemical Co.).

Other useful classes of anionic surfactants include, but are not limited to, the alkali metal salts of alkyl naphthalene sulfonic acids (methyl naphthalene sodium sulfonate, Petro AA, Petrochemical Corporation); sulfated higher fatty acid monoglycerides such as the sodium salt of the sulfated monoglyceride of cocoa oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium C14-C16-alphaolefin sulfonates such as the Bio-Terge series (Stepan Chemical Co.); alkali metal salts of sulfated ethyleneoxy fatty alcohols (the sodium or ammonium sulfates of the condensation products of about 3 moles of ethylene oxide with a C12-C15 n-alkanol, i.e., the Neodol ethoxysulfates, Shell Chemical Co.); alkali metal salts of higher fatty esters of low molecular weight alkylol sulfonic acids, e.g. fatty acid esters of the sodium salt of isothionic acid, the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toulene sulfonate and mixtures thereof.

A further useful class of anionic surfactants includes the 8-(4-n-alkyl-2-cyclohexenyl)-octanoic acids, wherein the cyclohexenyl ring is substituted with an additional carboxylic acid group. These compounds or their potassium salts, are commercially-available from Westvaco Corporation as Diacid 1550 or H-240. In general, these anionic surface active agents can be employed in the form of their alkali metal salts, ammonium or alkaline earth metal salts.

The wetting composition can further comprise an aqueous microemulsion of silicone particles. For example, U.S. Pat. No. 6,037,407, which is incorporated herein in its entirety by reference, describes organopolysiloxanes in an aqueous microemulsion. Typically, the wetting composition contains less than about 5 weight percent of a microemulsion of silicone particles based on the total weight of the wetting composition. In another aspect, the wetting composition contains from about 0.02 weight percent to about 3 weight percent of a microemulsion of silicone particles. Yet, in another aspect, the wetting composition contains from about 0.02 weight percent to about 0.5 weight percent of a microemulsion of silicone particles.

Silicone emulsions in general can be applied to the pre-moistened wipe by any known coating method. For example, the pre-moistened wipe may be moistened with a wetting composition comprising a water-dispersible or water-miscible, silicone-based component. Further, the wipe can comprise a nonwoven web of fibers having a water-dispersible binder, wherein the web is moistened with a lotion comprising a silicone-based sulfosuccinate. The silicone-based sulfosuccinate provides gentle and effective cleansing without a high level of surfactant. Additionally, the silicone-based sulfosuccinate provides a solubilization function, which prevents precipitation of oil-soluble components, such as fragrance components, vitamin extracts, plant extracts, and essential oils.

In one embodiment of the present invention, the wetting composition comprises a silicone copolyol sulfosuccinate, such as disodium dimethicone copolyol sulfosuccinate and diammonium dimethicone copolyolsulfosuccinate. In one aspect, the wetting composition comprises less than about 2 percent by weight of the silicone-based sulfosuccinate, and, in another aspect, from about 0.05 percent to about 0.30 percent by weight of the silicone-based sulfosuccinate.

In another example of a product comprising a silicone emulsions, Dow Corning 9506 powder can be present in the wetting composition. Dow Corning 9506 powder is believed to comprise a dimethicone/vinyldimethicone cross-polymer and is a spherical powder, which is said to be useful in controlling skin oils (see "New Chemical Perspectives," Soap and Cosmetics, Vol. 76, No. 3, March 2000, p. 12). Thus, a water-dispersible wipe, which delivers a powder effective in controlling skin oil, is also within the scope of the present invention. Principles for preparing silicone emulsions are disclosed in WO 97/10100.

The wetting composition of the present invention can contain one or more emollients. Suitable emollients include, but are not limited to, PEG 75 lanolin, methyl gluceth 20 benzoate, C12-C15 alkyl benzoate, ethoxylated cetyl stearyl alcohol, products marketed as Lambent wax WS-L, Lambent WD-F, Cetiol HE (Henkel Corp.), Glucam P20 (Amerchol), Polyox WSR N-10 (Union Carbide), Polyox WSR N-3000 (Union Carbide), Luviquat (BASF), Finsolv SLB 101 (Finetex Corp.), mink oil, allantoin, stearyl alcohol, Estol 1517 (Unichema), and Finsolv SLB 201 (Finetex Corp.).

An emollient can also be applied to a surface of the non-woven fabric prior to or after wetting with the wetting composition. Such an emollient can be insoluble in the wetting composition and can be immobile except when exposed to a force. For example, a petrolatum-based emollient can be applied to one surface in a pattern, after which the other surface is wetted to saturate the wipe. Such a product could provide a cleaning surface and an opposing skin treatment surface.

The emollient composition in such products and other products of the present invention can comprise a plastic or fluid emollient such as one or more liquid hydrocarbons (e.g., petrolatum), mineral oil and the like, vegetable and animal fats (e.g., lanolin, phospholipids and their derivatives) and/or a silicone materials such as one or more alkyl substituted polysiloxane polymers, including the polysiloxane emollients disclosed in U.S. Pat. No. 5,891,126, which is incorporated herein in its entirety by reference. Optionally, a hydrophilic surfactant can be combined with a plastic emollient to improve wettability of the coated surface. In some embodiments of the present invention, it is contemplated that liquid hydrocarbon emollients and/or alkyl substituted polysiloxane polymers may be blended or combined with one or more fatty acid ester emollients derived from fatty acids or fatty alcohols.

In an embodiment of the present invention, the emollient material is in the form of an emollient blend. For example, the emollient blend can comprise a combination of one or more liquid hydrocarbons (e.g., petrolatum), mineral oil and the like, vegetable and animal fats (e.g., lanolin, phospholipids and their derivatives), with a silicone material such as one or more alkyl substituted polysiloxane polymers. In another aspect, the emollient blend comprises a combination of liquid hydrocarbons (e.g., petrolatum) with dimethicone or with dimethicone and other alkyl substituted polysiloxane polymers. In some embodiments of the present invention, it is contemplated that blends of liquid hydrocarbon emollients and/or alkyl substituted polysiloxane polymers may be blended with one or more fatty acid ester emollients derived from fatty acids or fatty alcohols. PEG-7 glyceryl cocoate, available as Standamul HE (Henkel Corp., Hoboken, N.J.), can also be considered.

Water-soluble, self-emulsifying emollient oils, which are useful in the present wetting compositions, include the polyoxyalkoxylated lanolins and the polyoxyalkoxylated fatty alcohols, as disclosed in U.S. Pat. No. 4,690,821, which is incorporated herein in its entirety by reference. The polyoxyalkoxy chains comprise mixed propylenoxy and ethyleneoxy units. The lanolin derivatives typically comprise about 20-70 such lower-alkoxy units while the C12-C20-fatty alcohols will be derivatized with about 8-15 lower-alkyl units. One such useful lanolin derivative is Lanexol AWS (PPG-12-PEG-50, Croda, Inc., New York, N.Y.). A useful poly(15-20)C2-C3-alkoxylate is PPG-5-Ceteth-20, known as Procetyl AWS (Croda, Inc.).

Typically, the wetting composition contains less than about 25 weight percent of emollients based on the total weight of the wetting composition. In another aspect, the wetting composition can comprise less than about 5 weight percent emollient, and, in yet another aspect, less than about 2% emollient. Still, in another aspect, the wetting composition can contain from about 0.01 weight percent to about 8 weight percent of emollients. Yet still, in another aspect, the wetting composition can contain from about 0.2 weight percent to about 2 weight percent of emollients.

In one embodiment, the wetting composition and/or premoistened wipes of the present invention comprise an oil-in-water emulsion comprising an oil phase containing at least one emollient oil and at least one emollient wax stabilizer dispersed in an aqueous phase comprising at least one polyhydric alcohol emollient and at least one organic water-soluble detergent, as disclosed in U.S. Pat. No. 4,559,157, the entirety of which is herein incorporated by reference.

Surface feel modifiers can be employed with the non-woven fabric of the present invention to improve the tactile sensation (e.g., lubricity) of the skin during use of the product. Suitable surface feel modifiers include, but are not limited to, commercial debonders; and softeners, such as the softeners used in the art of tissue making including quaternary ammonium compounds with fatty acid side groups, silicones, waxes, and the like. Exemplary quaternary ammonium compounds with utility as softeners are disclosed in U.S. Pat. No. 3,554,862; U.S. Pat. No. 4,144,122; U.S. Pat. No. 5,573,637; and U.S. Pat. No. 4,476,323, the entirety of all of which is herein incorporated by reference. Typically, the wetting composition contains less than about 2 weight percent of surface feel modifiers based on the total weight of the wetting composition. In another aspect, the wetting composition contains from about 0.01 weight percent to about 1 weight percent of surface feel modifiers. Yet, in another aspect, the wetting composition contains from about 0.01 weight percent to about 0.05 weight percent of surface feel modifiers.

A variety of fragrances can be used in the wetting composition of the present invention. Typically, the wetting composition contains less than about 2 weight percent of fragrances based on the total weight of the wetting composition. In another aspect, the wetting composition contains from about 0.01 weight percent to about 1 weight percent of fragrances. Yet, in another aspect, the wetting composition contains from about 0.01 weight percent to about 0.05 weight percent of fragrances.

Further, a variety of fragrance solubilizers can be used in the wetting composition of the present invention. Suitable fragrance solubilizers include, but are not limited to, polysorbate 20, propylene glycol, ethanol, isopropanol, diethylene glycol monoethyl ether, dipropylene glycol, diethyl phthalate, triethyl citrate, Ameroxol OE-2 (Amerchol Corp.), Brij 78 and Brij 98 (ICI Surfactants), Arlasolve 200 (ICI Surfactants), Calfax 16L-35 (Pilot Chemical Co.), Capmul POE-S (Abitec Corp.), Finsolv SUBSTANTIAL (Finetex), and the like. Typically, the wetting composition contains less than about 2 weight percent of fragrance solubilizers based on the total weight of the wetting composition. In another aspect, the wetting composition contains from about 0.01 weight percent to about 1 weight percent of fragrance solubilizers. Yet, in another aspect, the wetting composition contains from about 0.01 weight percent to about 0.05 weight percent of fragrance solubilizers.

Opacifiers can be employed in the wetting composition. Suitable opacifiers include, but are not limited to, titanium dioxide or other minerals or pigments, and synthetic opacifiers such as REACTOPAQUE® particles (available from Sequa Chemicals, Inc., Chester, S.C.). Typically, the wetting composition contains less than about 2 weight percent of opacifiers based on the total weight of the wetting composition. In another aspect, the wetting composition contains from about 0.01 weight percent to about 1 weight percent of opacifiers. Yet, in another aspect, the wetting composition contains from about 0.01 weight percent to about 0.05 weight percent of opacifiers.

Suitable pH control agents for use in the wetting composition of the present invention include, but are not limited to, malic acid, citric acid, hydrochloric acid, acetic acid, sodium hydroxide, potassium hydroxide, and the like. An appropriate pH range minimizes the amount of skin irritation resulting from the wetting composition on the skin. Typically, the pH range of the wetting composition is from about 3.5 to about 6.5. In another aspect, the pH range of the wetting composition is from about 4 to about 6. Sill, in another aspect, the wetting composition contains less than about 2 weight percent of a pH adjuster based on the total weight of the wetting composition. In another aspect, the wetting composition contains from about 0.01 weight percent to about 1 weight percent of a pH adjuster. Yet, in another aspect, the wetting composition contains from about 0.01 weight percent to about 0.05 weight percent of a pH adjuster.

A variety of wetting compositions, formed from one or more of the above-described components, can be used with the wet wipes of the present invention.

EXAMPLES

Example 1

Air-laid handsheets were prepared using standard fiber blends (wood pulp) for comparison and blends of the fibers of the present invention (short flax). The compositions of the handsheets are shown in Table 3 below. The flax fibers were commercially available from Crailar Technologies, Inc., Lake Oswego, Oreg. The fibers were subjected to additional mechanical cleaning and carding to produce a loose rope or sliver. Rotary cutting equipment was used to cut the sliver into 4-5 mm average cut lengths.

The Celanese Dur-O-set® R latex was commercially available from Celanese Emulsion Polymers, Florence Ky. (Dur-O-Set® Elite 25-135A. The GP Cellulose, Golden Isles® wood pulp was commercially available from Georgia-Pacific, Atlanta, Ga. The binder fiber was commercially available from Trevira GmbH, Bobingen, Germany.

TABLE 3

Air-laid handsheet preparation

| Code | Wood pulp | Flax | Latex* | Binder Fiber |
|---|---|---|---|---|
| Conventional LBAL<br>LBAL = Latex Bonded Airlaid | 80%<br>GP Cellulose<br>Golden Isles ®<br>Type 4889 | none | 20%<br>Celanese<br>Dur-O-Set ®R<br>25-135A | none |
| Conventional MBAL<br>MBAL = Mult-Bonded Airlaid | 80%<br>GP Cellulose<br>Golden Isles ®<br>Type 4889 Fluff Pulp | none | 5%<br>Celanese<br>Dur-O-Set ®R<br>25-135A | 15%<br>Trevira Type 255,<br>6 mm, 2.2 dtex<br>bicomponent<br>(Core-sheath PET-PE) |
| Flax-Enhanced LBAL | 40%<br>GP Cellulose<br>Golden Isles ®<br>Type 4889 Fluff Pulp | 40%<br>Crailar ®<br>Flax<br>4-5 mm | 20%<br>Celanese<br>Dur-O-Set ®R<br>25-135A | none |
| Flax-Enhanced MBAL | 40%<br>GP Cellulose<br>Golden Isles ®<br>Type 4889 Fluff Pulp | 40%<br>Crailar ®<br>Flax<br>4-5 mm | 5%<br>Celanese<br>Dur-O-Set ®R<br>25-135A | 15%<br>Trevira Type 255,<br>6 mm, 2.2 dtex<br>bicomponent<br>(Core-sheath PET-PE) |

*Latex % refers to the final solids remaining on the sheet

The handsheets were produced on a 10"×12" laboratory-scale air-laid handsheet former. For each code in Table 3, the recited amounts of the wood pulp, flax, and binder fiber components were weighed to achieve the desired ratios and basis weights and then placed into the unit to produce an unbonded web. The unbonded web was then removed and compressed between metal plates on a MTP-14 Lab Press from Tetrahedron Associates, Inc. (San Diego, Calif.) to a pressure of about 26 psi for a duration of 20 seconds. After compression, the webs were removed from the press and placed onto a metal screen in preparation for adhesive application. Under vacuum, the webs were sprayed with a diluted mixture of the adhesive to achieve about 15% solids using a Spray Systems Company (Glendale Heights, Ill.) nozzle tip (product number SS11003). The webs were sprayed at a tip pressure of about 10 psi from a distance of about 10 inches from the web until the desired amount was applied. After adhesive application, the webs were dried in a Blue M model DC 580 forced air oven from SPX®

Thermal Product Solutions (White Deer, Pa.) at a temperature of about 150° C. for 2 minutes.

The air-laid handsheets prepared in Example 1 were preconditioned and characterized by standard methods. In particular, basis weights were measured weighing 3"×3" specimens on a digital scale and then converting to basis weight by the proper mathematical factor.

Peak Tensile load, breaking elongation, and total energy absorbed were measured using an Instron (Norwood, Mass.) Tensile Tester using 1×4" specimen sizes, a cross-head speed of 12 inches/minute, and a jaw span of 4 inches.

The water and motor oil holding capacities were determined by submerging 4"×4" (water) or 3"×3" (oil) specimen sizes into distilled water and Society of Automotive Engineers (SAE) motor oil, respectively, for 60 seconds followed by 2 minutes hanging vertically in air to allow excess to drip. The absorptive capacity was calculated by dividing the amount of liquid remaining in each specimen (wet weight after hanging minus initial dry weight) by the initial dry weight.

Dry caliper was measured using a Thwing-Albert Instrument Company (West Berlin, N.J.) Progage Electronic Thickness Tester with a 1" diameter anvil at a pressure of about 4.14 kPA. Table 4 below provides the resultant properties of the inventive air-laid handsheets with flax fiber blends compared to conventional handsheets.

to form the sheets of the desired basis weights. The samples were then removed from the screens and pressed on a Williams Standard press for about 5.5 minutes at 50 psi on one side, and an additional 2.5 minutes at 50 psi after turning the samples over. The samples were removed in the press and placed in drying rings overnight to air dry completely.

TABLE 5

Wet-laid handsheet preparation

| Code | Wood pulps | Flax |
| --- | --- | --- |
| Conventional Wood | 50% GP Cellulose Southern Softwood Kraft (SSWK) | none |
| Pulp Wet Laid | 50% GP Cellulose Southern Hardwood Kraft (SHWK) | |
| Flax - Enhanced Wet Laid | 40% GP Cellulose Southern Softwood Kraft (SSWK) 40% GP Cellulose Southern Hardwood Kraft (SHWK) | 20% Crailar ® Flax, 4-5 mm |
| Flax - Enhanced Wet Laid | 30% GP Cellulose Southern Softwood Kraft (SSWK) 30% GP Cellulose Southern Hardwood Kraft (SHWK) | 40% Crailar ® Flax, 4-5 mm |

The wet-laid handsheets of Example 2 were tested as shown in Table 6 below. The hand sheets were tested per Technical Association of the Pulp and Paper Industry

TABLE 4

Air-laid handsheet properties

| Code (see previous) | Basis Weight (gsm) | Dry Tensile Peak Load (g/linear inch) | Dry Breaking Elongation (%) | Dry Total Energy Absorbed (G/mm) | Wet Tensile Peak Load (g/linear inch) | Motor Oil Holding capacity (g/g) | Water Holding Capacity (g/g) | Dry Caliper 1 layer (mm) |
| --- | --- | --- | --- | --- | --- | --- | --- | --- |
| Conventional LBAL LBAL = Latex Bonded Airlaid | 70 | 224 | 22.5 | 1.0 | 152 | 15.8 | 12.4 | 1.5 |
| Flax-Enhanced LBAL | 139 | 1188 | 12.5 | 3.2 | 780 | 13.8 | 12.0 | 1.9 |
| Conventional MBAL MBAL = Mult-Bonded Airlaid | 98 | 510 | 24.0 | 2.6 | 350 | 16.5 | 16.4 | 1.6 |
| Flax-Enhanced MBAL | 101 | 1158 | 25.7 | 6.7 | 447 | 17.3 | 16.3 | 1.7 |

Example 2

Wet-laid handsheets were prepared using wood pulp only for comparison and inventive flax fiber blends as shown in Table 5 below. The samples were prepared on a laboratory-scale circular 6.25" diameter Testing Machines, Inc. (TMI) (Amityville, N.Y.) wet-laid hand sheet former. The dry pulps for each sample were weighed to achieve the desired composition ratios and soaked in distilled water for a minimum of 4 hours before placing in a British disintegrator for 5 minutes, diluted in 2 L of distilled water. No other additives were used in the preparation of these handsheets.

The samples were then transferred from the disintegrator into the handsheet former headbox and diluted to about 16 L before draining through the screen of the handsheet former method (TAPPI) T220 sp-01, "Physical Testing of Pulp Handsheets", as revised in 2001. The wet-laid handsheets were pre-conditioned and conditioned as per TAPPI test method T402 sp-13, revised 2013, "Standard Conditioning and Testing Atmospheres for Paper, Board, Pulp Handsheets and Related Products." Further, the samples were preserved in accordance with TAPPI test method T 400, "Sampling and Accepting a Single Lot of Paper, Paperboard, Containerboard, or Related Product." In particular, preservation included avoiding exposure of the sample to direct sunlight, extreme temperatures, and relative humidity above 65%. In this process, it was ensured that both surfaces were affected.

The samples were preconditioned for at least 4 hours at 10-35% relative humidity (RH) and 22-40° C. (72-104° F.). The samples were conditioned for 4 hours at 50.0%±2.0% RH and 23.0±1.0° C. (73.4±1.8° F.).

TABLE 6

| | | Dry Tensile Peak Load (kg/15 mm) | Dry Breaking Elongation (%) | Dry Total Energy Absorbed (kg/mm) | Wet Tensile Peak Load (g/15 mm width) | Water Holding Capacity (g/g) | Motor Oil Holding capacity (g/g) | Caliper 5 Sheet (mils/ 5 sheets) |
|---|---|---|---|---|---|---|---|---|
| Code | Basis Weight (Gsm) | | | | | | | |
| Conventional Wood Pulp Wet Laid | 43.77 | 1.337 | 2.778 | 0.567 | 9 | 9 | 3.97 | 14.64 |
| Flax-Enhanced Wet Laid (20% flax) | 44.09 | 1.245 | 3.674 | 0.744 | 9 | 9 | 4.42 | 16.71 |
| Flax-Enhanced Wet Laid (40% flax) | 65.10 | 1.389 | 3.821 | 0.901 | 13 | 13 | 3.68 | 27.17 |

Basis weight was determined by weighing 5 conditioned TAPPI handsheets together on a scale sensitive to 0.001 g. The area of each sheet was approximate and taken to be 200 cm². The basis weight was calculated from the weight of the 5 sheets and reported grams per square meter (g/m²) and pounds per 3,000 square feet.

Caliper was determined by measuring the conditioned TAPPI hand sheets using a micrometer according to TAPPI test T411 om-11, revised 2011, "Thickness (Caliper) on Paper and Paperboard." The micrometer was calibrated using gauge standards with thicknesses known to within 0.0005 mm (0.00002 in.). The parallelism of the faces was confirmed and placed on a solid level surface free from noticeable vibration. The thickness of each specimen at 5 non-overlapping regular intervals was measured, ensuring that the measurement was not too close to the edges. When measuring the thicknesses, it was ensured that the readings more than 5% above the others were not caused by shives, specks, or foreign matter, by measuring thickness nearby any suspect reading. The thickness value was reported in mils of an inch.

Motor oil holding capacity determines the oil holding capacity for predetermined times of soaking and draining Motor oil capacity was measured by cutting at least 3 test specimens measuring 3"×3". While handling the specimen with dry fingers and without subjecting them to any compression or stretching, the specimens were weighed to the nearest 0.001 grams. A specimen was soaked in motor oil for 1 minute, ensuring it was submerged in the oil within 5 seconds of contacting it. Tweezers were used to remove the specimen from the oil, which was then hung to drip excess motor oil for 2 minutes. The weight of the specimen was recorded. All 3 specimens were soaked, drip drained, and weighed.

The motor oil holding capacity (MOHC) in grams of oil held per square meter was determined using the following formula:

$$MOHC\ (g/m^2) = \frac{(Wet\ Wt - Dry\ Wt)(g)}{9\ in^2} \times \frac{1550\ in^2}{m^2}$$
$$= (Wet\ Wt - Dry\ Wt)(g) \times 172$$

The motor oil holding capacity (oil/fiber) ratio (MOHCR) was determined in units of grams of oil held per square meter using the following formula:

$$MOHCR = \frac{Wet\ Wt\ (g)}{Dry\ Wt\ (g)}$$

Special cutting of the samples was required for strength testing. A 15 mm (0.59 in.) cutting device, or a single-knife cutter with a guide, was used to provide a 15 mm (0.59 in.) wide strip. Two samples should were cut using the special cutting device to provide 2 specimens whose common edge exactly bisected the conditioned TAPPI hand sheet and which were 15 mm (0.59 inches) in width.

Dry tensile strength, stretch, and tensile energy absorption were simultaneously obtained on the preconditioned TAPPI handsheets and tested according to TAPPI test T494 om-13, revised 2013, "Tensile Breaking Properties of Paper and Paperboard (Using Constant Rate of Elongation Apparatus)," with the following exceptions: a) at least one of the specimens tested came from each set of the 5 sheets, b) the jaws of the tensile tester were set 100 mm apart, and c) the size of the specimen.

The rate of separation of the jaws was 25.5 mm/min (nominally 1.0 in./min). The sample was clamped into the two jaws, and the test separation of the jaws was initiated. Following sample breakage, the dry tensile strength, stretch, and tensile energy absorbed were recorded.

For wet tensile strength measurements, the specimen was clamped into the tensile tester and wetted using the Payne sponge method, in which a wet sponge was contacted with a 1 inch length of the sheet sufficient to appear wet.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A nonwoven fabric comprising substantially pectin-free, straight, individualized bast fibers having a mean length less than 6 millimeters (mm).

2. The nonwoven fabric of claim 1, wherein bast fibers are fibers extracted from flax, hemp, jute, ramie, nettle, Spanish broom, kenaf plants, or any combination thereof.

3. The nonwoven fabric of claim 1, wherein the bast fibers have less than 10% by weight of the pectin content of the naturally occurring fibers from which the substantially pectin-free fibers are derived.

4. The nonwoven fabric of claim 1, wherein the bast fibers have less than 15% by weight of the pectin content of the naturally occurring fibers from which the substantially pectin-free fibers are derived.

5. The nonwoven fabric of claim 1, wherein the bast fibers have less than 20% by weight of the pectin content of the naturally occurring fibers from which the substantially pectin-free fibers are derived.

6. The nonwoven fabric of claim 1, wherein the bast fibers having a mean length of at least about 4 mm.

7. The nonwoven fabric of claim 1, further comprising crimped or straight staple fibers.

8. The nonwoven fabric of claim 1, further comprising crimped or straight man-made cellulosic fibers, thermoplastic fibers, or any combination thereof.

9. The nonwoven fabric of claim 1, further comprising pulp fibers.

10. The nonwoven fabric of claim 1, further comprising staple fibers and pulp fibers.

11. The nonwoven fabric of claim 1, wherein the nonwoven fabric is a wet wiper, a dry wiper, an impregnated wiper, a sorbent, a medical supply product, a personal protective fabric, an automotive protective covering, a personal care article, a fluid filtration product, a home furnishing product, a thermal insulation product, an acoustic insulation product, an agricultural application product, a landscaping application product, or a geotextile application product.

12. The nonwoven fabric of claim 1, wherein the nonwoven fabric is a baby wipe, a cosmetic wipe, a perinea wipe, a disposable washcloth, a kitchen wipe, a bath wipe, a hard surface wipe, a glass wipe, a mirror wipe, a leather wipe, an electronics wipe, a lens wipe, a polishing wipe, a medical cleaning wipe, a disinfecting wipe, a surgical drape, a surgical gown, a wound care product, a protective coverall, a sleeve protector, a diaper, a feminine care article, a nursing pad, an air filter, a water filter, an oil filter, or a furniture backing.

13. A method of making the nonwoven fabric of claim 1, the method comprising:
chemically treating naturally occurring fibers to substantially remove pectin and form straight, substantially individualized bast fibers;
forming randomly arrayed fiber web of the straight, substantially individualized bast fibers; and
bonding the randomly arrayed fiber web to form the nonwoven fabric.

14. The method of claim 13, further comprising adding thermoplastic fibers to the individualized fibers and thermal bonding the nonwoven fabric.

15. The method of claim 13, wherein bonding is hydroentangling.

16. The method of claim 13, wherein the randomly arrayed fiber web is formed using an airlaid forming process.

17. The method of claim 13, wherein the randomly arrayed fiber web is formed using a coform process.

18. The method of claim 13, further comprising embossing to provide a pattern.

19. The method of claim 13, wherein the randomly arrayed fiber web is formed in a belt-creped process.

20. The method of claim 13, wherein the randomly arrayed fiber web is formed in a wet-lay process.

21. The method of claim 13, wherein the randomly arrayed fiber web is bonded using an adhesive.

22. A laminate comprising the nonwoven fabric of claim 1, a film, and an adhesive disposed between the fabric and the film.

23. The laminate of claim 22, wherein the film comprises a polyethylene polymer, a polyethylene copolymer, a polypropylene polymer, a polypropylene copolymer, a polyurethane polymer, a polyurethane copolymer, or a styrenebutadiene copolymer.

24. The laminate of claim 22, wherein the film comprises linear low density polyethylene.

25. The laminate of claim 22, wherein the adhesive is a sprayable latex, a polyalphaolefin, or an ethylene vinyl acetate.

26. The laminate of claim 22, wherein the film is a breathable film.

27. A method of making the laminate of claim 22, the method comprising:
chemically treating naturally occurring fibers bundled with pectin to substantially remove pectin and form substantially individualized bast fibers;
forming a randomly arrayed fiber web comprising the substantially individualized bast fibers;
bonding the randomly arrayed fiber web to form the nonwoven fabric having a support surface;
disposing an adhesive onto either the support surface of the nonwoven fabric or a film;
disposing the film onto the support surface of the nonwoven fabric; and
nipping to form the laminate.

28. The method of claim 27, wherein the film comprises a polyethylene polymer, a polyethylene copolymer, a polypropylene polymer, a polypropylene copolymer, a polyurethane polymer, a polyurethane copolymer, or a styrenebutadiene copolymer.

29. The method of claim 27, wherein the film comprises linear low density polyethylene.

30. The method of claim 27, wherein the adhesive is a sprayable latex, a polyalphaolefin, or an ethylene vinyl acetate.

31. A laminate comprising a first nonwoven fabric and another fabric bonded to the first nonwoven fabric, the first nonwoven fabric being the nonwoven fabric of claim 1, the another fabric being at least one of a second nonwoven fabric or a woven fabric, the second nonwoven fabric optionally being an additional nonwoven fabric of claim 1.

32. The laminate of claim 31, wherein the another fabric is bonded to the first nonwoven fabric with an adhesive.

* * * * *